United States Patent
Shibata et al.

(10) Patent No.: US 7,287,188 B2
(45) Date of Patent: Oct. 23, 2007

(54) WORK MACHINE MAINTENANCE SYSTEM

(75) Inventors: Koichi Shibata, Ibaraki (JP); Hiroshi Watanabe, Ushiku (JP); Genroku Sugiyama, Ryugasaki (JP); Hiroyuki Adachi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 268 days.

(21) Appl. No.: 10/488,407

(22) PCT Filed: Aug. 28, 2002

(86) PCT No.: PCT/JP02/08662

§ 371 (c)(1),
(2), (4) Date: Mar. 3, 2004

(87) PCT Pub. No.: WO03/023539

PCT Pub. Date: Mar. 20, 2003

(65) Prior Publication Data

US 2004/0199831 A1  Oct. 7, 2004

(30) Foreign Application Priority Data

Sep. 5, 2001 (JP) ............................. 2001-268718

(51) Int. Cl.
*G06F 11/00* (2006.01)
(52) U.S. Cl. ............................................ 714/21
(58) Field of Classification Search ................. 714/21, 714/43
See application file for complete search history.

(56) References Cited

U.S. PATENT DOCUMENTS

| | | | | |
|---|---|---|---|---|
| 5,553,303 A | * | 9/1996 | Hayashi et al. ................. 707/2 |
| 5,678,002 A | * | 10/1997 | Fawcett et al. ............... 715/709 |
| 6,070,155 A | * | 5/2000 | Cherrington et al. ........ 705/400 |
| 6,643,801 B1 | * | 11/2003 | Jammu et al. ................ 714/37 |
| 6,697,962 B1 | * | 2/2004 | McCrory et al. ............. 714/27 |
| 6,795,935 B1 | * | 9/2004 | Unkle et al. .................. 714/37 |
| 2005/0027586 A1 | * | 2/2005 | Bacon et al. ................. 705/10 |
| 2005/0131596 A1 | * | 6/2005 | Cherrington et al. ......... 701/29 |

FOREIGN PATENT DOCUMENTS

| | | |
|---|---|---|
| JP | 9-32039 | 2/1997 |
| JP | 11-102399 | 4/1999 |
| JP | 2000-210800 | 8/2000 |
| JP | 2000-259729 | 9/2000 |
| JP | 2001-118019 | 4/2001 |
| JP | 2001-195119 | 7/2001 |

* cited by examiner

*Primary Examiner*—Scott Baderman
*Assistant Examiner*—Joshua Lohn
(74) *Attorney, Agent, or Firm*—Mattingly, Stanger, Malur & Brundidge, P.C.

(57) ABSTRACT

A maintenance system of a hydraulic excavator (11) is provided with a maintenance monitoring device (21), a maintenance management server (12) for managing trouble information and operating information for each working machine, a model information server (13), and a service personnel mobile terminal (14) connected to one another through the Internet (15). When trouble occurs in the hydraulic excavator, the maintenance system (21) transmits trouble information to the maintenance management server (12), and the maintenance management server (12) transmits information on occurrence of trouble to the mobile terminal (14) and displays it on a display unit. This system manages the maintenance manuals and other data for each model in a model information database separate from the maintenance database and correlates the two databases based on the model data.

2 Claims, 3 Drawing Sheets

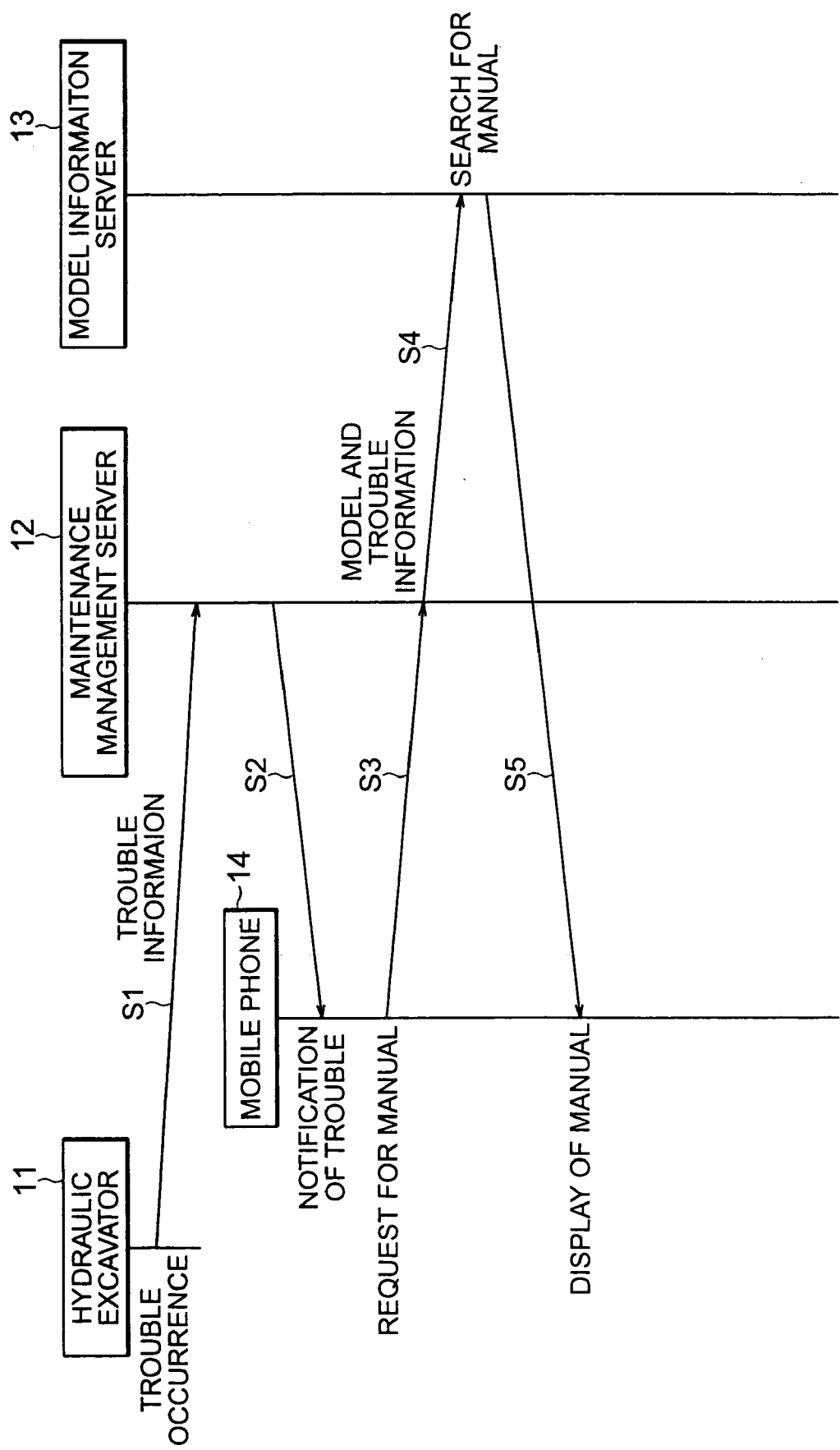

WORK MACHINE MAINTENANCE SYSTEM

TECHNICAL FIELD

The present invention relates to a maintenance system of a working machine, and more particularly, relates to a maintenance system of a working machine for monitoring troubles in an engine, hydraulic pump, hydraulic motor, operating mechanism, or parts in a hydraulic excavator, and performing unitary management on maintenance manuals, and the inventory of repair parts, etc. through a network.

BACKGROUND ART

Conventional fault-diagnosis or troubleshooting of a working machine disposed at a work site has usually been performed by the actions of service personnel trained in troubleshooting heading out to the site, performing work for detaching the outer panels of the working machine, running conduction checks on the various sensors and the like, then diagnosing trouble locations, and causes of trouble based on the results of the inspection and in accordance with the experience and knowledge of the service personnel while referring to a repair manual. Next, the service personnel was asked to repair the troubles as requested by the customer as a result of the troubleshooting. Depending on the content of the trouble, sometimes the service personnel could immediately repair the trouble in the site, but other times he had to make the repair while referring to a more detailed repair manual when his experience was insufficient or the trouble was complicated. Further, sometimes parts had to be replaced to repair the trouble. When a detailed repair manual was required or when the inventory of replacement parts had to be examined, he returned to the office.

According to the troubleshooting based on the "Data Collection Device of Drive Machines" disclosed in Japanese Patent Publication (A) No. 7-30977 (Japanese Patent No. 2767363), a body controller mounted on the body of a working machine is connected with an external controller through a communications line, the two controllers communicate, and a troubleshooting program is executed by the body controller and the external controller collects trouble data and diagnoses the trouble based on the trouble data.

The method of service personnel heading out to the work site in which the working machine is disposed to diagnose trouble is troublesome and poor in the efficiency of the maintenance work. Further, when the trouble cannot be immediately repaired on the site, it becomes necessary to return to the office to obtain information of more detailed repair manuals or information on inventory of replacement parts. This is inconvenient for the service personnel and further reduces the work efficiency. In this case, the customer cannot determine when the trouble will be fixed and cannot draw up a work schedule. Further, there was the problem that an estimate of the costs required for repair of the trouble could not be immediately prepared.

With the troubleshooting method disclosed in Japanese Patent Publication (A) No. 7-30977, the work of troubleshooting is simplified and improvement of the work efficiency is aided. However, this method requires that the service personnel transport the external controller to the site, connect the external controller to the body controller mounted in the working machine, and start up a troubleshooting program. In the sense of the service personnel heading out to the site, this method had the same problem as the above-explained conventional troubleshooting method. Also, in view of repairing the trouble the above-mentioned problems are not solved.

On the other hand, in recent years, the working machines have become more diverse in models and design to meet with customer requests. Specifications differ according to the models, and it becomes necessary to prepare manuals or troubleshooting tools, etc. individually for maintenance or repair of the models. Managing the maintenance manuals etc. becomes troublesome and separate work is required for checking inventories or placing orders for the parts for repairing the trouble by referring to parts lists for the different models. Accordingly, time and trouble are required for the maintenance and repair.

Further, recently, there are rental companies owning large numbers of working machines. Some rental companies manage the working machines and maintain and repair them on their own. Even such rental companies suffer from the above problems in maintenance in the same way as the machinery manufacturers.

An object of the present invention is to solve the above problem and provide a maintenance system for a working machine effective for a user such as a rental company independently managing the machines, in which maintenance manuals, part lists, or other data for different models are managed by a model information database of the machinery manufacturer, constructed separately from the maintenance database managed by the machinery manufacturer or rental company, etc., the two databases are correlated on the basis of the model so as to be able to centralize the maintenance work, reduce the work time for maintenance and diagnosis, raise the work efficiency.

SUMMARY THE INVENTION

A maintenance system of a working machine according to the present invention is configured as follows to achieve the above object.

A maintenance system of a working machine of the present invention is comprised of a least one working machine provided with a maintenance monitoring device having a communicating means, a maintenance management server for managing trouble information and operating information of the working machine for each working machine, a model information server, and a service personnel mobile terminal. A maintenance monitor device of the working machine, the maintenance management server, the model information server, and the mobile terminal are connected through the Internet over which the fact of occurrence of trouble, the content of the trouble, predetermined data, necessary information, etc. can be sent in accordance with need. The working machine managed by this maintenance system is located at a remote location such as a work site. Since there are several service personnel, there is also at least one mobile terminal. As the mobile terminal, preferably an Internet-capable mobile phone provided with a display unit is used. The maintenance monitor device of the working machine collects operating information and trouble information relating to the working machine, stores them in a built-in storage unit, and transmits them through a communicating means and the Internet to the maintenance management server. The maintenance management server receives the operating information and trouble information and stores the operating information and trouble information for each working machine. The model information server is provided with a manual database, part inventory database, and estimate database for each model. In this configuration, when the working machine experiences trouble, the maintenance monitor device transmits information relating to trouble to the maintenance management server, while the maintenance management server transmits the fact of occurrence of the trouble to the mobile phone and displays it on the display unit.

According to the maintenance system of the above working machine, it is possible to perform the series of tasks of grasping the method of approach at the time trouble arises, confirming the inventory of parts required for repair of the trouble, and, when necessary, performing the work for placing orders and thereby possible to reduce the work time spent on maintenance. When a working machine runs into trouble, this state is collected by the mounted maintenance monitor device and is automatically informed to the maintenance management server utilizing the Internet etc. The maintenance management server receiving the information relating to the occurrence of trouble stores the trouble information in a file for each working machine (each model and machine No.) and simultaneously notifies the mobile terminal of the related service personnel of the fact of the occurrence of the trouble in the working machine covered and the content of the trouble. Due to this, the service personnel can easily and accurately determine which working machine experienced what kind of trouble even without heading out to the work site. Further, in the maintenance system, the server system is divided into a maintenance management server for managing maintenance and a model information server managed by the machinery manufacturer. By having the maintenance management server operated by the machinery manufacturer, dealer, rental company, customer, etc., while having the model information server operated by the machinery manufacturer, it is possible to efficiently maintain and manage data.

The maintenance system of a working machine of the present invention further provides the above configuration where preferably the maintenance management server accesses the model information server to search through a manual database based on a request for a maintenance manual sent from a mobile terminal to the maintenance management server and the model information server acquires manual information corresponding to the request and transmits it to the mobile terminal. According to the configuration, when the service personnel has insufficient information relating to the repair of trouble, he can obtain a maintenance manual through the communicating means and does not have to bring the troubleshooting manual etc. to the work site or return to the office. Therefore, the efficiency of the maintenance work can be improved.

The maintenance system of a working machine of the present invention further provides the above configuration where preferably the model information server searches through the part inventory database and estimate database corresponding to the content of trouble, acquires inventory information of the parts for repair of trouble and estimate information for repair of trouble, and transmits them to the mobile terminal. According to this configuration, since it is possible to obtain inventory information on the parts required for repair of trouble, it is possible to immediately determine when the parts will be acquired or the repair parts and the repair date and possible to easily and quickly find the costs required for the repair. Further, it is possible to use the mobile terminal to place an order based on the inventory information.

BRIEF DESCRIPTION OF THE DRAWINGS

FIG. 3 is a flow chart of information flow (processing operation) at the time of occurrence of trouble.

DETAILED DESCRIPTION OF THE PREFERRED EMBODIMENTS

A preferred embodiment of the present invention will be explained below based on the attached drawings.

The configuration, shape, size, and layout explained in the embodiments are only shown in general to an extent enabling the present invention to be understood and carried out. Therefore, the present invention is not limited to the embodiment explained below and can be modified in various ways so long as the scope of the technical idea shown in the claims is not exceeded.

Figure 1:
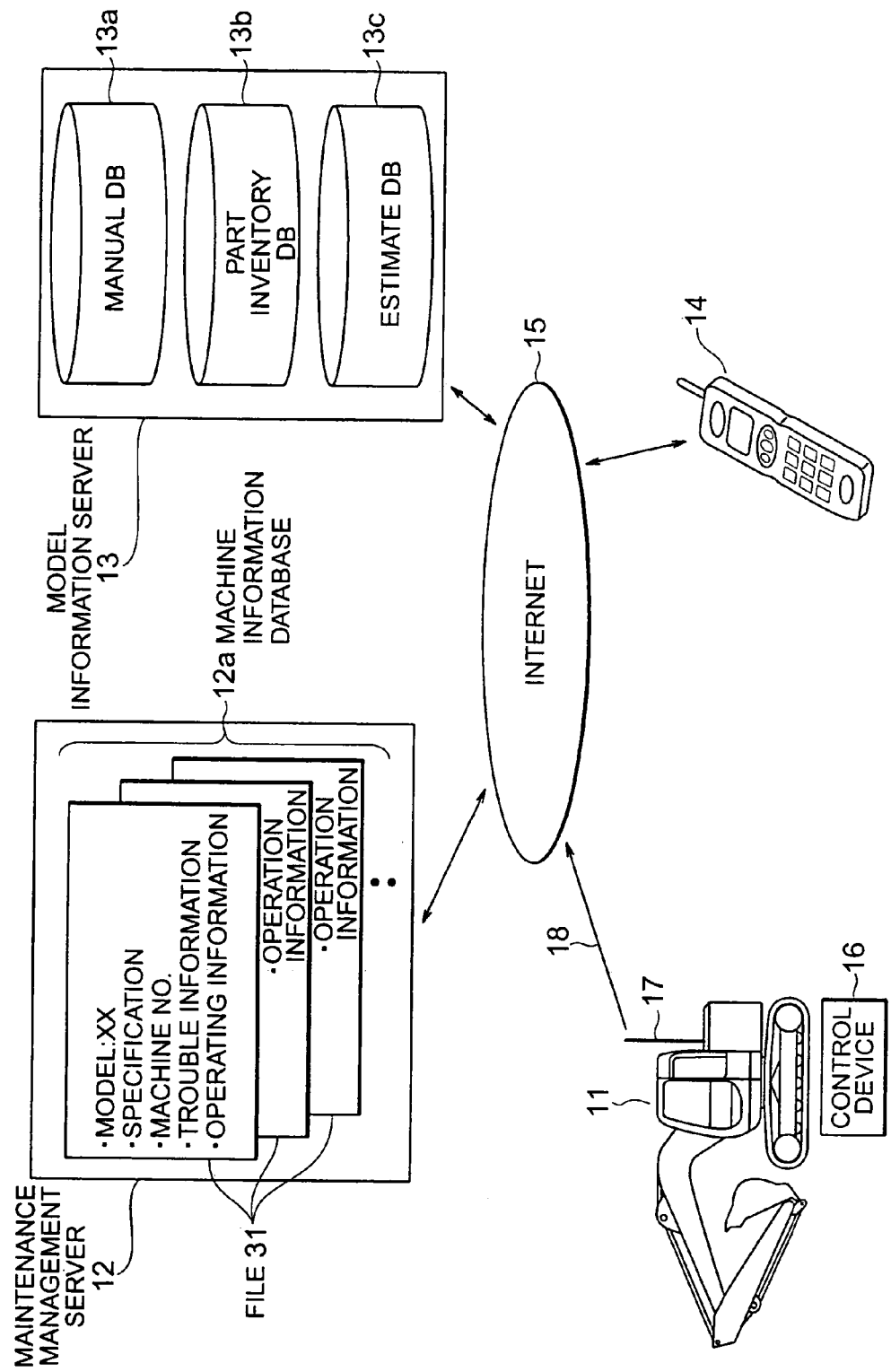
FIG. 1 is a view of the system configuration showing the general configuration of a maintenance system of a working machine according to the present invention.

FIG. 1 shows the overall configuration of a maintenance system according to the present invention. In this embodiment, a hydraulic excavator is shown as an example of a working machine. In FIG. 1, a hydraulic excavator 11 provided at a work site, a maintenance management server 12, a model information server 13, and a mobile phone 14 are shown. These are connected through the Internet (electrical communications lines) 15 and are designed to transfer data etc. over it.

In FIG. 1, the example of one hydraulic excavator 11 is shown. The number of hydraulic excavators 11 is arbitrary. Normally a large number of hydraulic excavators are managed. Each hydraulic excavator 11 mounts a control device 16. The control device 16 is configured by a computer and is provided with an operation control unit, processing unit, storage unit, communication device, etc. The operation control unit is a functional unit for controlling the operation of the engine and attachment. The functions are realized by executing the operational control programs provided in the storage unit. The processing unit executes the various control programs etc. or produces control data required for control based on detection information according to the operating state obtained from the operational sensors etc. The storage unit stores the various programs and the state of operation, operational data obtained from maintenance, etc. The communication device is a means for executing communication when the processing unit communicates relating to the transfer of data with the outside through an antenna 17 or radio or other wireless means 18 and the Internet 15. The hydraulic excavator 11 is configured to transfer information with the outside through the Internet 15 based on the communication device of the control device 16. The control device 16 of the hydraulic excavator 11 is further provided with the function of monitoring the operating state, maintenance state, and trouble state of the hydraulic excavator, that is, a maintenance monitor device.

Figure 2:
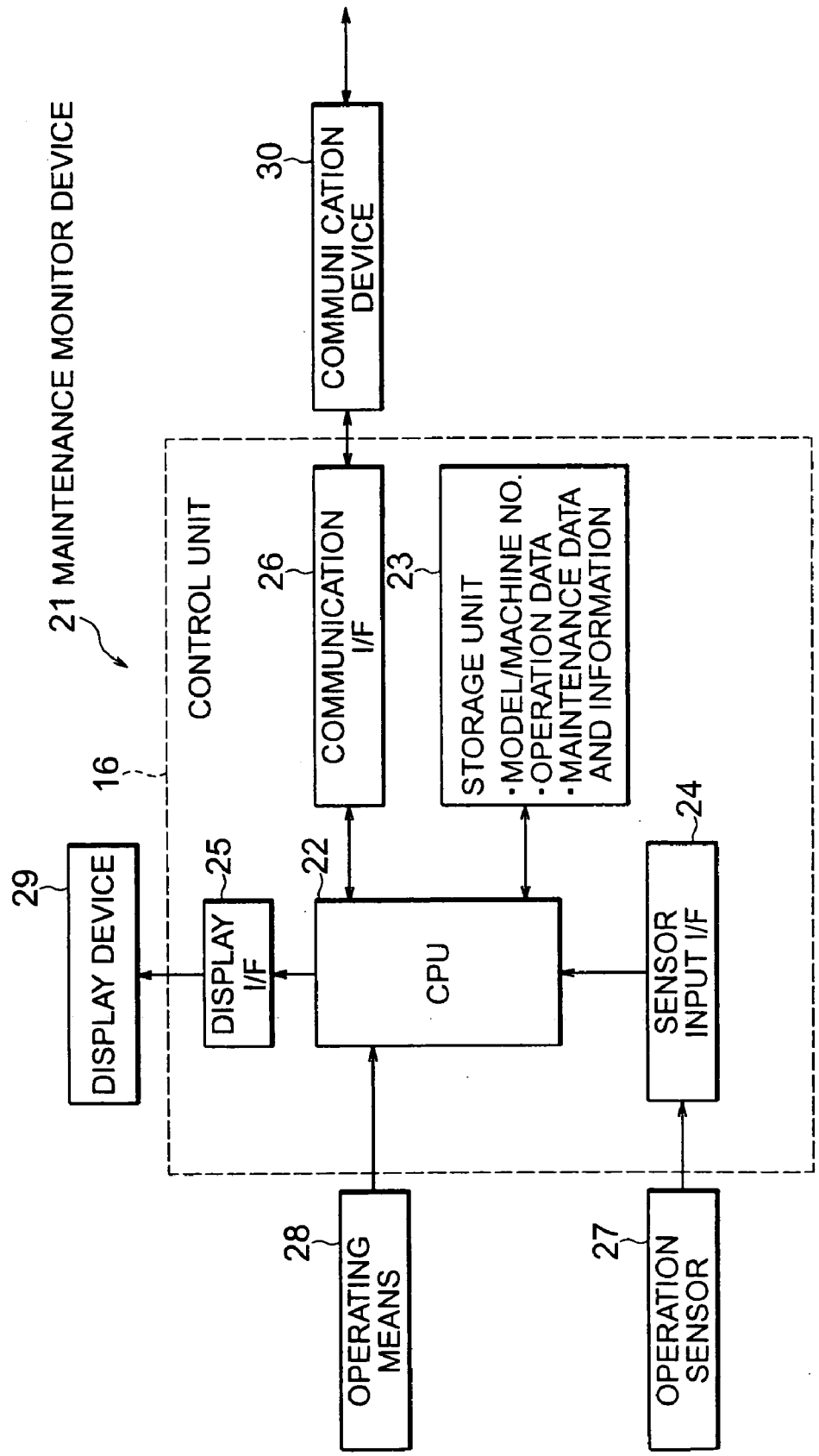
FIG. 2 is a block diagram of the configuration of a maintenance monitor device provided in a control device of a hydraulic excavator.

The above-mentioned maintenance monitor device provided at the hydraulic excavator will be explained in accordance with FIG. 2. The maintenance monitor device 21 is realized by a control device 16 comprised of a computer. The control device 16 is comprised of a CPU 22, storage unit (memory) 23, sensor input interface (I/F) 24, display interface (I/F) 25, and communication interface (I/F) 26. The engine, hydraulic system, fuel feed system, and other parts of the hydraulic excavator 11 are provided with operation sensors 27. The signals relating to the operations detected by these operation sensors 27 are input through the sensor input interface 24 to the CPU 22. The CPU 22 stores operating data based on the various operating signals in the storage unit 23. The storage unit 23 stores programs and data for various processing. The programs include for example an operational control program, a periodic maintenance processing program, a troubleshooting programs, etc. The data stored includes operating data, model and machine No. data, information relating to the attachment, maintenance data and information, and trouble information. The driver's compartment of the hydraulic excavator is provided with various types of operating means 28 for instructing operations. The operating signals from the operating means 28 are input to the CPU 22. The control device 16 is provided with a display device 29. The display device 29 is a vehicle-mounted display device installed in the driver's compartment. Data to be displayed is sent from the CPU 22 through the display interface 25. Information relating to maintenance is displayed on the screen of the display device 29. Further, the maintenance monitor device 21 is connected with the above communication device 30. The communication device 30 functions as a data communication terminal. Various data is transferred through the communication device 30 between the control device 16 and the maintenance management server 12 or the model information server 13. The communication device 30 is connected through the communication interface 26 with the CPU 22.

According to the maintenance monitor device 21 having the above configuration, operating data relating to operational control and maintenance data by periodically executed maintenance processing are collected and stored in the storage unit 23. The operating data, maintenance data, etc. are transmitted based on a transmission program at suitable timings through the communication device 30 and the Internet 15 to the maintenance management server 12. The maintenance management server 12 records the operating data and maintenance data as operating information in the corresponding file. When a certain hydraulic excavator 11 has trouble, the CPU 22 executes a troubleshooting program and the trouble information is collected and stored in the storage unit 23. The trouble information is simultaneously transmitted based on a transmission program through the communication device 30 and the Internet 15 to the maintenance management server 12. The maintenance management server 12 records the received trouble information in the file corresponding to the model and model number of the hydraulic excavator.

In the above-mentioned configuration, the maintenance management server 12 and the model information server 13 are configured independently as two separate servers. The maintenance management server 12 is managed by the machinery manufacturer or rental company of the hydraulic excavator. The maintenance management server 12 is provided with a machine information database 12a in addition to the basic configuration of a normal computer. The machine information database 12a is provided with a file 31 for each hydraulic excavator 31. Each file 31 stores model information, specifications, the machine No., trouble information, operating information, and other data. The model information server 13 is provided with a manual database 13a, a part inventory database 13b, and an estimate database 13c for each model along with the basic configuration of a normal computer. The manual database 13a stores data relating to the work procedures for dealing with trouble in accordance with the trouble information. The part inventory database 13b manages the state of inventory of parts used for each model. The data of the part inventory database 13b is searched through and used when re-supply of parts is required.

The mobile phone 14 is an Internet-capable mobile terminal carried and used by service personnel. The mobile phone 14 is provided with a display unit. The display unit displays information relating to trouble transmitted from the maintenance management server 12 or model information server 13 in accordance with need, inventory information of repair parts, estimate information relating to repair, etc. Note that the mobile phone 13 is an example of a mobile terminal. Mobile terminals are not limited to the mobile phones 14.

Referring to FIG. 3, the routine from the occurrence of trouble to the display of the manual at the mobile phone 14 will be explained focusing on the flow of data for the example of trouble occurring at the hydraulic excavator 11.

If any trouble occurs in the main body of the hydraulic excavator 11, trouble information, as explained above, is sent to the maintenance management server 12 (step S1). The trouble information is recorded together with the model and operating information in a corresponding file 31 in the machine information database 12a in the maintenance management server 12 for each model or machine No. relating to the hydraulic excavator 11. The maintenance management server 12 next notifies the mobile phone 14 of the service personnel of the occurrence of trouble relating to the hydraulic excavator 11 (step S2). The service personnel notifies the content of the trouble through the mobile phone 14. Regarding the content of trouble, when the service personnel himself knows how to deal with trouble, he deals with it. When he does not know how to deal with it, he accesses the maintenance management server 12 to request a manual corresponding to the trouble (step S3). When the maintenance management server 12 receives a request for a corresponding manual by the mobile phone 14 from service personnel, it accesses the model information server 13 (step S4) and searches for a manual in the manual database 13a. When it finds the corresponding manual in the search for the manual at the manual database 13a, it transmits the manual information to the mobile phone 14 (step S5), whereby the corresponding manual is displayed at the display unit of the mobile phone 14. Therefore, the service personnel can deal with the trouble in the hydraulic excavator 11 in accordance with the manual displayed at the display unit of the mobile phone 14.

As explained above, when the service personnel is at a location away from the hydraulic excavator 11 or when he is traveling, he can confirm information on the trouble occurring by receiving a notification of trouble from the maintenance management server 12. Further, even when receiving notification of trouble of the hydraulic excavator 11 and when the approach to the trouble is not known, it is possible for him to connect to the maintenance management server 12, request the corresponding manual and thereby immediately obtain the manual corresponding to the trouble on the location, and immediately head out to the work site where the hydraulic excavator 11 is disposed without having to return to the office.

In the above-mentioned embodiment, the example was shown of utilization of only the manual database 13a in the model information server 13, but with notifications according to trouble information sent to a mobile phone 14, sometimes parts are required for repair in order to deal with any trouble occurring. In this case, it is possible to search through information and investigate the state of inventory by the part inventory database 13b provided in the model information server 13 relating to the state of inventory of the parts required for repair. Due to this, the service personnel can place an order through the mobile phone 14 based on the information sent from the model information server 13 and can immediately notify the customer of the deliverable date from this. Due to this, the service personnel can present the user of the hydraulic excavator 11, that is, the customer, with a repair date etc.

The estimate database 13c provided in the model information server 13 stores data relating to estimates of costs required for repair in accordance with the content of the repair of the trouble. Therefore, for estimates of repairs, it is possible to obtain an estimate corresponding to repair in accordance with a request or automatically from the estimate database 13c. The data relating to the obtained estimate is sent from the model information server 13 to the mobile phone 14 together with the data relating to a corresponding manual based on the manual database 13a explained above or data relating to the deliverable date based on the part inventory database 13b. Due to this, service personnel can present a customer with a repair estimate on the location of the work site.

As explained above, the present invention provides the maintenance system constructed so as to grasp the operating states of work machine such as hydraulic excavators disposed at the work sites and deal with maintenance or repair at the time of occurrence of trouble, and configured to automatically notify terminal devices held by service personnel of information relating to trouble from the maintenance management server, and configured to enable provision of required information to be requested from a terminal device to the maintenance management server. As a result, the service personnel can obtain trouble information at any location, can notify corresponding manual information relating to trouble from the model information server in accordance with need, part inventory information required for repair, and estimate information regarding the cost relating to repair, can easily and quickly grasp the method of dealing with trouble when it occurs in a working machine, and can easily confirm the state of inventory of the repair parts. Further, by utilizing mobile terminals, it is possible to perform work for repairing trouble even at a location other than the work sites and possible to reduce the work time spent on maintenance and repair of trouble. Further, by dividing the configuration of the server system into a maintenance management server and model information server, it is possible to rationally and reliably maintain and manage various types of data.

INDUSTRIAL APPLICABILITY

The present invention is configured to grasp the state of operation of working machines disposed at work sites and deal with repairs at the time of occurrence of trouble, monitor trouble in the engines, hydraulic pumps, or other parts of working machines from a remote location, and centrally manage maintenance manuals through a network.

The invention claimed is:

1. A maintenance system of a working machine including at least one working machine provided with a maintenance monitoring device having a communicating means, a maintenance management server for managing trouble information and operating information of said working machine for each working machine, a model information server, and a service personnel mobile terminal, and being configured so as to connect said maintenance monitor device of said working machine, said maintenance management server, said model information server, and said mobile terminal through the internet, wherein said maintenance monitor device of said working machine collects operating information and trouble information relating to said working machine, stores them in a storage unit, and transmits them through said communication means and the Internet to said maintenance management server, said maintenance management server receives said operating information and said trouble information and stores said operating information and said trouble information for each working machine, said model information server, which is independent from said maintenance management server and is managed by a manufacturer of said working machine, is provided with a manual database, a part inventory database, and an estimate database for each model, wherein said estimate database stores data relating to estimates of costs required for repair in accordance with a content of repair required for a particular trouble, when said working machine experiences some trouble, said maintenance monitor device transmits information relating to said trouble to said maintenance management server, and said maintenance management server transmits the fact of occurrence of said trouble to said mobile terminal and displays it on a display unit thereof, said maintenance management server accesses said model information server to search through said manual database based on a request for a maintenance manual sent from said mobile terminal to said maintenance management server, and said model information server acquires manual information corresponding to said request and transmits it to said mobile terminal, wherein said model information server searches through said part inventory database and said estimate database corresponding to the content of said trouble, acquires inventory information of the parts for repair of said trouble and estimate information for repair of said trouble, and transmits such information to said mobile terminal.

2. The maintenance system according to claim 1, wherein said model information server searches through said part inventory database and said estimate database corresponding to the content of said trouble, acquires inventory information of the parts for repair of said trouble and estimate information for repair of said trouble, and transmits such information to said mobile terminal in response to a request sent from said mobile terminal, wherein said request is sent from said mobile terminal when it is not possible to fix the working machine at a site at which the working machine is located without additional parts.

* * * * *